United States Patent [19]

Zeman

[11] 4,134,551
[45] Jan. 16, 1979

[54] EMITTER FOR DRIP IRRIGATION

[76] Inventor: David G. Zeman, 10030 S. Greenleaf, Santa Fe Springs, Calif. 90670

[21] Appl. No.: 723,012

[22] Filed: Sep. 13, 1976

[51] Int. Cl.² ............................................. B05B 1/32
[52] U.S. Cl. .................................................... 239/542
[58] Field of Search ............... 239/542, 533.1, 533.13, 239/553; 222/529; 138/45, 46; 61/12, 13

[56] References Cited
U.S. PATENT DOCUMENTS

| | | | |
|---|---|---|---|
| 3,285,477 | 11/1966 | Marona et al. | 222/529 X |
| 3,300,099 | 1/1967 | Marona | 222/529 X |
| 3,899,136 | 7/1975 | Harmony | 239/542 X |
| 3,918,646 | 11/1975 | Leal-Diaz et al. | 239/542 X |
| 3,970,251 | 7/1976 | Harmony | 239/542 X |

*Primary Examiner*—Joseph F. Peters, Jr.
*Assistant Examiner*—Norman L. Stack, Jr.
*Attorney, Agent, or Firm*—Edward D. O'Brian

[57] ABSTRACT

A desirable emitter for use in drip irrigation can be constructed so as to utilize an elongated member formed of a flexible, resilient material so as to include at least one and preferably a number of internal ribs or projections which prevent the interior of the member from being closed off or pinched shut as it is deformed or flexed. Such a member is normally mounted so as to extend into an enclosed space such as the interior of an irrigation tube or conduit in such a manner that water can flow from the interior to the exterior of the space through the member. The liquid within the space can be controlled so as to exert a force against the exterior of the emitter causing it to be deformed or flexed in such a manner as to vary the flow through the member.

2 Claims, 7 Drawing Figures

EMITTER FOR DRIP IRRIGATION

BACKGROUND OF THE INVENTION

The invention set forth in this specification pertains to new and improved emitters for use in connection with drip irrigation. It is primarily directed toward emitters which are responsive to the force applied by water within the interior of an enclosed space or conduit so as to accomplish a flow control function.

It is considered well known that emitters for use in drip irrigation are devices which are intended to dispense or emit comparatively small quantities of liquid from an enclosed space such as the space within the interior of a tube or conduit as and where such liquid is needed for agricultural or similar purposes. An extremely large number of different types of emitters have been constructed and used. It appears that the most desirable emitters for many types of applications are structures which are responsive to the water within such an enclosed space in the sense that they are capable of opening up so as to provide a comparatively large passage leading from the interior of such an enclosed space when substantially no water is being supplied to the interior of such a space and in the sense that they are capable of "closing up" to a degree when significant water is supplied to the interior of such a space so as to emit or dispense only a limited or restricted quantity of water.

Emitters of the type indicated in the preceding sentence are considered to be particularly advantageous in many applications because in effect they serve as flow regulators dispensing or emitting quantities of liquid in accordance with the water supplied to the interior of a tube, conduit, or the like. If properly constructed such emitters can dispense water at substantially a uniform rate regardless of the flow and water conditions within the interior of a tube, conduit, or similar structure. Further, when water conditions within an enclosed space or even adjacent to such an emitter are such that the emitter is essentially open, contaminants which might cause mal-performance of other types of emitters can flow into and through the emitter so as to be dispensed from it.

An understanding of the invention is not considered to require or necessitate a detailed discussion of all of the known emitters which are responsive to the water within a pipe, conduit, or the like, so as to dispense a regulated or controlled flow of water. The present invention is directed toward improving flow regulating emitters which are constructed so as to utilize an elongated tubular member which is adapted to be deformed or flexed in accordance with the water supply within a pipe, conduit, or related enclosure. A device of this type is shown in FIG. 8 of the Whear U.S. Pat. No. 3,512,363, entitled "MOISTURE DISTRIBUTION SYSTEM". This device is described in the specification of this patent as consisting of a drainage tube.

It is understood that devices as are illustrated in this FIG. 8 of this patent have been primarily utilized as valves in draining tubes or the like. It is understood that such devices as are commercially manufactured consist of short lengths of an extruded tube of a flexible, resilient material which have been deformed slightly through the application of heat along lines transverse to their axes so as to facilitate their being flexed in response to applied force of moving water so as to close off their interiors. When water is no longer applied to such devices so as to cause them to close off, the inherent properties of the material in such devices causes them to revert to their initial configurations, allowing water to drain through them.

Such a drainage tube can be utilized as an emitter by carefully controlling the water conditions within a pipe, conduit or related enclosure so that such a tube does not completely close off as it is contacted by water, but instead deforms or flexes in response to the applied water within a pipe, conduit or the like so that the passage through the tube varies in dimension in accordance with variations in the water contacting the tube. As this occurs the variation in the size of the passage causes the tube to act as a flow regulator such that the amount of water passing through the tube does not vary to any significant extent as there is variation in the water flow within the interior of the pipe or conduit.

The use of these drainage tubes as are described in the noted Whear patent as emitters is not considered desirable because of the degree of control of applied water which is necessary to utilize such a drainage tube as a satisfactory emitter. Such control is necessary because the performance of such a drainage tube—either as a drainage tube or as an emitter—will be related to a number of factors. An important one of these factors is the temperature of the water used in connection with such a tube. There is always a danger that when such a tube is used as an emitter that it will be inadvertently and/or undesirably "operated" by the applied water so that such a tube will unintentionally completely pinch or close off or will dispense a greater quantity of water than desired.

BRIEF SUMMARY OF THE INVENTION

An object of the present invention is to provide new and improved emitters for use in drip irrigation. A more specific object of the present invention is to provide emitters each of which consists of an elongated tubular member of a flexible, resilient material which are constructed in such a way that they cannot be operated or used so as to cut off the flow of water through these members. Further objects of the invention are to provide emitters as herein described which may be easily and conveniently constructed at a comparatively nominal cost, which may be easily installed upon conventional water distributing tubes, conduits or in similar related locations with a minimum of difficulty, and which are capable of performing satisfactorily over a prolonged period in virtually any use situation.

In accordance with this invention these objectives are achieved by providing in an emitter for use in drip irrigation having an elongated tubular member formed of a flexible, resilient material which is capable of flexing or deforming so as to restrict the flow of fluid through the tubular member the improvement which comprises: internal means located within the interior of the tubular member for preventing the tubular member from flexing or deforming so as to completely close off the interior of the tubular member.

BRIEF DESCRIPTION OF THE DRAWING

The invention is best more fully described in connection with the accompanying drawing in which.

The particular emitters illustrated are constructed so as to utilize the concepts of the invention verbally expressed in the appended claims. These concepts can be utilized in different manners so as to create emitters which are somewhat different from the precise emitters shown through the use or exercise of routine engineering skill in the drip irrigation field. Further, these emitters may be utilized in a wide variety of different ways for different agricultural purposes.

DETAILED DESCRIPTION

Figure 1:
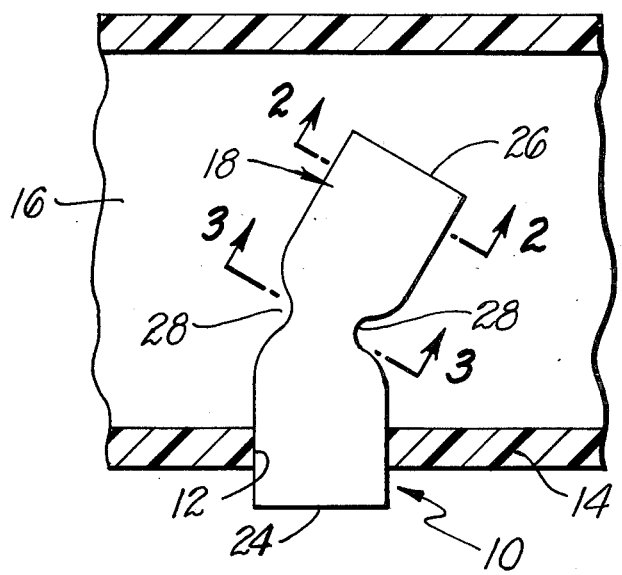
FIG. 1 is a side elevational view of a presently preferred embodiment or form of an emitter in accordance with this invention installed in the wall of a flexible pipe or conduit.
Figure 2:
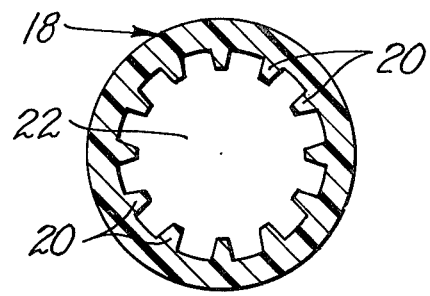
FIG. 2 is a corss-sectional view at an enlarged scale taken at line 2—2 of FIG. 1.
Figure 3:
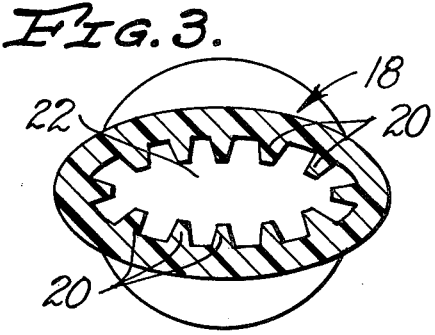
FIG. 3 is a cross-sectional view at an enlarged scale taken at line 3—3 of FIG. 1.

In FIGS. 1 to 3 of the drawings there is shown an emitter 10 in accordance with this invention which is installed in a hole 12 in the wall 14 of an elongated tube 16 of a type conventionally utilized in conveying water in drip irrigation. If desired this tube 16 may be referred to as a conduit, a manifold, a pipe or the like. The purpose of the tube 16 is to provide an internal closed space (not separately numbered) into and through which water can pass during the use of the emitter 10. It will be recognized that virtually any structure capable or providing such an enclosed space can be used with emitters such as the particular emitter 10.

This emitter 10 consists of an elongated tubular member 18 which is preferably formed by known extrusion techniques so as to have a plurality of ribs or projections 20 located within its interior 22 so as to extend between its ends 24 ad 26. This member 18 is preferably formed of a flexible, resilient material which will flex and deform as the emitter 10 is contacted by water moving into the tube 16 so as to exert a force against the emitter 10. It is presently preferred to form this member 18 out of a material such as a known type of synthetic rubber which does not change significantly in flexibility and/or resiliency within a normal range of ambient temperatures. This is considered important in minimizing and/or avoiding the operation of the emitter 10 varying in accordance with the temperature of the water contacting it and/or in accordance with the temperature in a field.

Preferably the tubular member 18 is "crimped" after it is extruded so as to provide a crimp 28 located intermediate its ends 24 and 26. The crimp 28 may conveniently be created in various known manners such as, for example, by applying a comparatively thin, hot tool against the member 18 transverse to the axis of the member 18 and beveling the member 18 as it is hot in such a manner as to partially reform the polymer structure within this member 18 so that the tubular member 18 extends at an angle having its apex at about the location of the crimp 28. Such a crimp 28 causes the interior 22 of the member 18 at about the location of the crimp 28 to have an oval or elliptical type shape as indicated in FIG. 2. This shape is most pronounced along the line where the tool has been applied in creating the crimp 28. The interior 22 gradually changes away from this oval type shape to the initial extruded shape in accordance with distance away from this crimp 28.

In effect the crimp 28 provides a line of weakness extending transverse to the axis of the tubular member 18 which is adapted to facilitate bending and deformation of the member 18. As the emitter 10 is utilized the end 24 is mounted on the hole 12 so that the member 18 extends into the tube 16 and so that the crimp 28 is adjacent to the wall 14. This end 24 may conveniently be secured in place in any known, conventional manner. Thus, when appropriate materials are used it can be secured in place through the use of a conventional adhesive. With the structure shown the end 24 is slightly smaller in diameter than the hole 12 so that the end 24 is "squeezed" and is held within the hole 12 by friction resulting from the tendency of the end 24 to expand outwardly against the hole 12. If desired a conventional holder (not shown) may of course be utilized in lieu of the end 24.

As the emitter 10 is installed as indicated water supplied to within the tube 16 can act upon the member 18 in a known manner so as to cuase this member 18 to bend and deform or flex generally in the area of the crimp 28. As this occurs there will be flow through the emitter 10. As this occurs the interior 22 will tend to decrease in area in the vicinity of such deformation in accordance with the force applied to the exterior of the member 18 by the water and this latter will regulate the flow through the emitter in accordance with the applied force of the water. An important feature of the present invention is that the ribs 20 prevent the interior 22 form completely closing off as a result of such deformation because they abut against the portions of the interior 22 which tend to come together as the member 18 bends about the crimp 28. This use of the ribs 20 makes it possible to prevent the interior 22 from ever being completely closed off. Thus there is no way that the emitter 10 can function as an on-off drainage valve.

This structure is also important in several other regards. Because the flexure of the member 18 is in the area of the crimp 28 such closing down in area tends to occur in a line like area extending transverse to the member 18. In effect, the area involved here acts as a variable orifice. As a consequence of the member being closed down in this restricted area and as a consequence of the use of the ribs 20 there is only minimal danger of the interior 22 being held in a closed down or restricted configuration as a result of accumulations of material such as algae and/or related biological slime passing through and adhering to the interior 22.

This is to be contrasted wth certain prior emitters containing at least one wall which is adapted to be forced by water against another wall. Such structures have comparatively large areas which are in mutual contact and it is considered that there is a significant danger that biological growth will tend to act more or less as an adhesive to hold such areas in contact with one another after they have been brought into contact with one another. While this can be controlled to a degree through the use of chlorine, a copper compound or the like, the use of such an agent is considered to be disadvantageous.

With an emitter of the type to which this invention pertains it is important that the emitter in effect defines or creates a variable sized opening or passage through which water can flow in accordance with the force applied to the exterior of the emitter so that the emitter will dispense or emit substantially a uniform volume of water regardless of variation in the force applied by the water. In order to achieve this effect it is necessary that the inherent physical properties of the material employed by the member 18 be such that the member 18 will return to its initial configuration as the force of applied water is decreased to zero or substantially zero. The particular emitter 10 is constructed in such a manner that the ribs 20 facilitate such return to an initial configuration by spacing the portions of the interior 22 which come toward one another as water exerts significant force against the emitter 10 so that biological accumulations as noted at most exercise only a limited adherence effect tending to hold the interior 22 in a restricted or closed down configuration. Further, as previously noted, these ribs 20 provide a convenient means for preventing the member 18 from being bent so as to close off the interior 22.

It is considered that these functions can be achieved through the use of only a single rib 20 extending in the member 18 so as to be roughly intermediate of the sides (not separately numbered) of the crimp 28. It is preferred to utilize a plurality of these ribs 20 as shown since when a plurality of these ribs 20 are utilized there can be no problem about locating at least one rib in a desired location to prevent the member 18 from being completely closed off. The precise shape of the ribs 20 is considered to be relatively immaterial so long as these ribs are sufficiently small as to not interfere with the flexure of the member 18. However, the ribs should be sufficiently large so as to prevent the interior 22 from being completely closed off.

Figure 4:
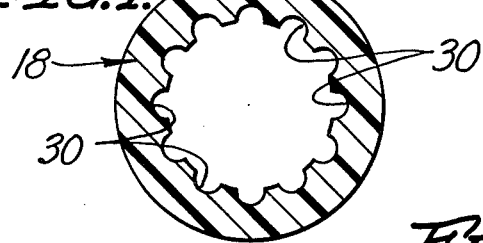
FIG. 4 is a view corresponding to FIG. 2 showing a modification of the emitter shown in the preceding figures.

Although it is not preferred it is possible to modify the tubular member 18 as indicated in FIG. 4 so as to omit the ribs 20 and to substitute in lieu thereof grooves 30. Such grooves 30 will function to prevent the interior 22 of an emitter from ever being completely closed off. They are considered not to be as desirable as the ribs 20 because to accommodate these grooves 30 the tubular member 18 has to be sufficiently thick to provide material enough to contain these grooves 30. This tends to effect the deformability of the member 18 in response to the force of applied water. Further, when the grooves 30 are used the areas between these grooves 30 may tend to be adhered to one another to a degree by biological slime in the vicinity of the crimp 28 because these areas are essentially brought into contact with one another as an emitter as described is used.

Figure 6:
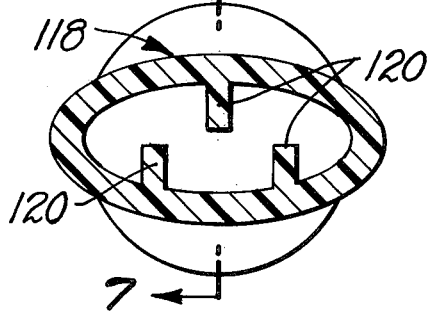
FIG. 6 is a cross-sectional view taken at line 5—5 of FIG. 4.
Figure 5:
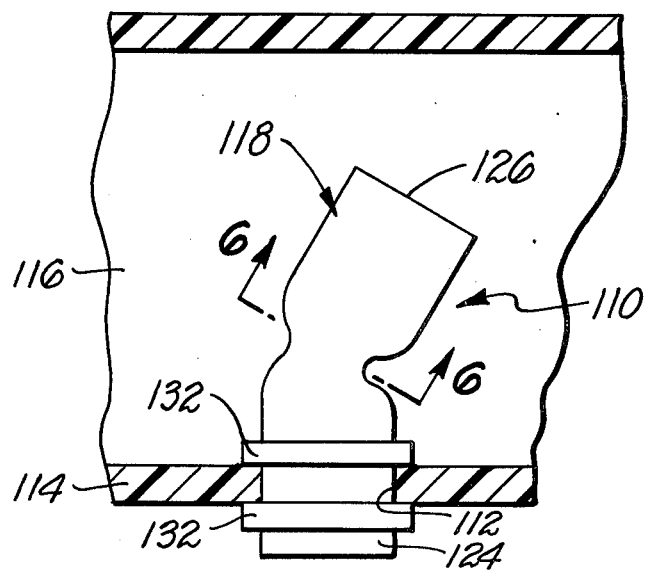
FIG. 5 is a side elevational view of a modified emitter which is similar to the emitter shown in FIG. 1.
Figure 7:
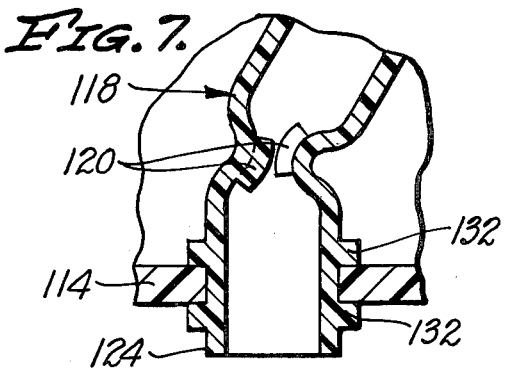
FIG. 7 is a cross-sectional view taken at line 6—6 of FIG. 4.

In FIGS. 5, 6 and 7 of the drawing there is shown a modified emitter 100 which is quite similar to the emitter 10 previously described. For convenience of explanation and in the interest of brevity those parts of the emitter 100 which are the same or substantially the same as corresponding parts of the emitter 10 are not separately described herein and are indicated in the drawing and in the remainder of this specification by the numerals previously used to designate such parts preceded by the numeral "1".

The emitter 100 differs from the emitter 10 in several regards. This emitter 100 is intended to be molded out of a material as indicated in accordance with conventional techniques so that the end 124 is provided with spaced flanges 132 which resiliently engage the wall 114 adjacent to the hole 112 in order to hold the emitter 100 in position. Because of the manner in which the emitter 100 is manufactured it is possible to form this emitter 100 so that the crimp 128 is initially in place or formed in this emitter 100. Further, because of this method of manufacture there is no necessity for the use of ribs 120 which extend between the ends 124 and 126 of the member 118. With this structure the ribs 120 are merely located within the interior 122 in the vicinity or region of the crimp 128 where the emitter 100 will tend to close down in accomplishing a flow regulating function in response to applied pressure.

It is noted that the word "tubular" has been utilized in the preceding in describing the shape of the member 18. It is considered to be advantageous to utilize a member 18 which as initially manufactured is tubular in the sense that it is of a cylindrical configuration. It is to be understood, however, that this word "tubular" is used in a generic sense so as to cover various tubular structures which are closely related to cylindrical tubes, such as, for example, tubes having a somewhat oval configuration. At the present time it is considered that it would be preferable to manufacture members such as the members 18 and 118 so that they have substantially a uniform wall thickness. However, it is considered to be within the scope of the present invention to vary the wall thickness of such a member either as such a member is extruded or molded so as to provide lines or areas along such a member which will facilitate flexure of the member in a desired or intended manner.

To a degree this type of thing can be accomplished as, for example, when a crimp 28 is being created in the manner indicated in the preceding by causing the material to "thin out" on the side toward which the member 18 flexes. Also, this type of thing can be accomplished by controlling wall thickness in the area of the crimp 128 during injection molding of the member 118. In either of these cases it is considered preferable to have the wall thickness on the entire side of the member 18 or 118 toward which the member deflects or bends be thinner than on the other side of such member. Also this type of expedient is fairly simple to accomplish by either extrusion and/or injection molding techniques so as to form approximately one half of the circumference of a member 18 or 118 thinner than the remainder along the length of such a member.

I claim:

1. In an emitter for use in drip irrigation having an elongated tubular member, formed of a flexible, resilient material which is capable of deforming in response to the force of water applied to the exterior of said member so as to restrict the flow of water through the interior of said member, the improvement which comprises:

internal means located within the interior of said tubular member for preventing said tubular member from deforming so as to completely close off the interior of said tubular member, said internal means comprising a plurality of ribs located so as to be spaced from one another within the interior of said member for preventing opposed surfaces of said member from being deformed so as to come in contact with one another, said tubular member is deformed intermediate its ends generally along a line extending transverse to said member so as to be capable of bending along said line in response to the force of water applied to the exterior of said member.

2. In an emitter for use in drip irrigation having an elongated tubular member, formed of a flexible, resilient material which is capable of deforming in response to the force of water applied to the exterior of said member so as to restrict the flow of water through the interior of said member, the improvement which comprises:

internal means located within the interior of said tubular member for preventing said tubular member from deforming so as to completely close off the interior of said tubular member, said internal means comprising a plurality of grooves located so as to be spaced from one another within the interior of said member, said tubular member is deformed intermediate its ends generally along a line extending transverse to said member so as to be capable of bending along said line in response to the force of water applied to the exterior of said member.

* * * * *